Aug. 6, 1968   A. L. LIEPA   3,396,036
POTATO FOOD PRODUCT
Filed Aug. 15, 1963
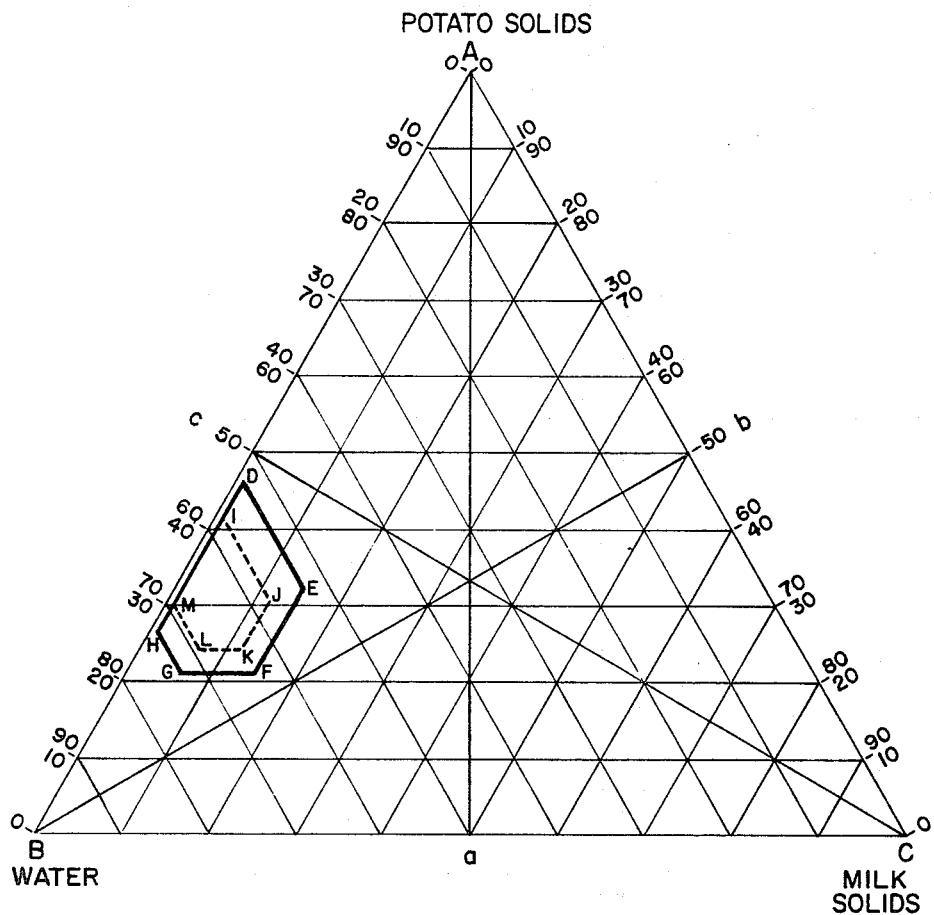
Alexander L. Liepa
INVENTOR.
BY Thomas J. Flaherty
ATTORNEY

United States Patent Office 3,396,036
Patented Aug. 6, 1968

3,396,036
POTATO FOOD PRODUCT
Alexander L. Liepa, Cincinnati, Ohio, assignor to The Procter & Gamble Company, Cincinnati, Ohio, a corporation of Ohio
Filed Aug. 15, 1963, Ser. No. 302,282
4 Claims. (Cl. 99—100)

ABSTRACT OF THE DISCLOSURE

A potato product suitable for frying is prepared by gently intermixing potato solids, milk solids, and water to provide a dough having, on a weight basis, from about 21% to about 46% potato solids, from about 1% to about 15% milk solids, and from about 53% to about 73% water, the combined milk solids-potato solids content being at least about 27% by weight. The dough can be formed into suitable shapes and either fried immediately or preserved for later use.

---

This invention relates to potato based dough compositions suitable for the preparation of fried potato products. The term "fried potato products" refers to various shaped potato products prepared by conventional French frying techniques.

Fried potato products are customarily prepared by so-called French or "deep fat" frying in which the potato sections are completely immersed and cooked in a comparatively large volume of liquid fat, shortening, or cooking oil at temperatures of about 350° F. for several minutes. The method of preparing potatoes has created certain undesirable characteristics in the resultant fried product, and these undesirable characteristics are especially noticeable in potato compositions used to approximate natural fried potato products. The potato dough compositions which approximate natural potato products generally lack strength and rigidity and are sticky or pasty in consistency and texture. They often expand and puff, becoming deformed, and, in some instances, generally disintegrate during frying. The resultant fried products prepared from these dough compositions also tend to be unsatisfactory with respect to color, appearance, and eating quality; they often have an "off flavor" rather than the desired bland flavor. Frozen potato compositions known in the art have generally been unsatisfactory when fried, being soggy in texture and grayish in color.

In an attempt to overcome difficulties encountered in the preparation of satisfactory fried products from these potato compositions, various substances have been used as "binders" in the compositions. "Binders" are substances which tend to make the compositions more durable and to endow them with better "holding-together" characteristics during cooking. These binders include substances such as potato starch, wheat starch, arrowroot starches, egg whites and gums, such as guar, arabic, tragacanth, karaya, locust bean, okra, agar-agar, and seaweed gum. However, all of these substances, other than egg whites, contribute to a tendency in the product for the interior to pull away from the outside shell of the potato product during the frying operation. This tendency generally results in a product which has a fragile French-fried exterior shell and a loose, frequently undercooked, cylinder of material in the interior. The use of egg whites does not result in the development of such an adverse effect, although fried potato products which utilize egg whites as binders are generally unsatisfactory in that they are very dry and have an unnatural texture and taste in the mouth. All of these binder substances, although they result in products which are desirable in some respects, fail to achieve one or more of the following desirable characteristics: strength, rigidity, and non-stickiness of doughs; absence of expansion, puffing, deformation, and disintegration during frying; and desirable and appetizing color, appearance, flavor, and eating quality of the fried products.

Thus, it is an object of this invention to provide a potato based composition which is suitable for forming into various shapes and frying to produce a fried potato product which has a desirable color, appearance, flavor, and eating quality.

It is a further object of this invention to provide a potato based dough composition which fries very quickly and which retains its shape during frying.

Still another object of this invention is to provide a potato based dough composition which is neither sticky nor pasty nor dry and crumbly and which can be easily handled prior to frying.

The above objects can be achieved by preparing a potato based dough composition comprising from about 21% to about 46% by weight potato solids, about 1% to about 15% by weight milk solids, and about 53% to about 73% by weight water, the combined milk solids-potato solids content being at least about 27% by weight of the mixture. In addition, minor amounts of salt and other flavoring agents and emulsifying substances can be included in the compositions. This mixture is suitable for the formation of strips or sheets, which, when sectioned into appropriate sizes and deep fat fried, result in a desirable fried potato product.

The attached graph is a trilinear diagram which shows the above range of ingredients in the compositions of applicant's invention. Axis A–a of this diagram represents percent potato solids, axis B–b represents percent water, and axis C–c represents percent milk solids. The percent water content includes (in addition to purposely added water) any water which is contributed to the composition through use of fresh potatoes, whole milk, and small amounts of water present in dehydrated potato granules, flakes, and milk solids. The range of ingredients in the compositions of the present invention lie within the area defined by DEFGHD of the trilinear diagram. Especially preferred compositions of this invention lie within the area defined by IJKLMI of the trilinear diagram.

The specific ranges of ingredients here set out are critical to the achievement of the foregoing objects of this invention. By way of illustration, compositions containing more than about 73% by weight water tend to puff undesirably during frying; the dough itself is too soft to handle and it tends to disintegrate prior to completion of frying. If less than about 53% by weight water is present, the dough is too dry and tends to be crumbly resulting in an undesirable dry quality in the fried product. It is necessary for the combined milk solids-potato solids content to be at least about 27% by weight of the mixture if the dough is to have sufficient body to be easily handled prior to frying.

Generally, deviation from the ranges of ingredients in the compositions of this invention results in compositions which are unsatisfactory with respect to handling convenience, performance during frying, or deficiencies in the resulting fried product. In this regard it has been found that especially desirable results are achieved in the present invention when 24% to 41% by weight potato solids are combined with 1% to 12 by weight milk solids and 58% to 69% by weight water, the combined potato solids-milk solids content being at least about 27% by weight of the mixture. (This range of ingredients is shown by the area defined by IJKLMI in the trilinear diagram.) Minor amounts of salt, other flavoring agents, and emulsifying substances can also be included. These ranges of ingredients are preferred since within these ranges the desirable characteristics of the compositions of this invention are optimized.

The potato solids used in this invention can be dehydrated granules (such as those prepared by fluidized bed dehydration techniques), "flakes" (such as those prepared by drum drying techniques) or fresh potato particles. The potato solids should consist essentially of intact potato cells if flavor and proper dough consistency are to be maintained; for this reason substances such as potato flours and similar potato-derived powders are generally unsuitable for this invention. Potato granules are especially durable during mixing and are especially preferred. Since fresh potatoes contain a relatively large amount of water, it is usually necessary to include dried potato granules or flakes in the mix in sufficient quantity to maintain the minimum 27% milk solids-potato solids content of the invention.

Fat and non-fat-containing milk solids or whole milk can be used as long as the minimum total of 27% by weight potato and milk solids is maintained in the compositions. Since whole milk contains a relatively large amount of water (approximately 87%), it is preferable to use dehydrated potato granules or flakes with whole milk in order to maintain the necessary minimum 27% milk solids-potato solids content.

A wide variety of techniques can be used to combine the ingredients which comprise the composition of this invention. In one method the appropriate milk solids and potato solids ingredients are thoroughly intermixed (in a device such as a ribbon mixer, paddle mixer, or Hobart mixer by mixing for 2 to 3 minutes at about 60 r.p.m. for example) together with any other dry ingredients which are to be included, such as salt, other flavoring substances, emulsifiers, and preservatives. This dry mix is then combined with water in a separate container and continuously mixed, using a mixing device and technique which is sufficiently gentle so as not to destroy the potato cells present and thus preserve the flavor and consistency (for example, by mixing with a Hobart mixer or a continuous paddle mixer for 2 to 3 minutes at about 60 r.p.m.). The dough-like mass thus produced is then formed (e.g., extruded, rolled, or cut) into strips and sectioned into segments of the desired length and either cooked immediately or preserved (e.g., by steam or oil blanching and freezing) and packaged until cooking is desired. As mentioned, many other preparative and mixing techniques can also be used.

Ordinary frying temperatures (i.e., approximately 300°–400° F.) are appropriate for preparation of cooked products from the formed compositions of the present invention. An outstanding feature of the compositions of this invention is that they require a much shorter time to cook than do formed potato products prepared from natural potato sections or formed potato products prepared from known potato compositions. For products made from compositions of this invention, cooking at 325° to 375° F. is completed in 1½ to 2½ minutes, whereas previously known potato products suitable for frying generally require at least 5 to 6 minutes to cook at these temperatures.

The final fried potato product of the present invention is characterized by a desirable crispness and uniformity in texture. It has a light brown color and retains a desirable bland potato flavor.

Applications of the above-described invention are illustrated by the following examples (all parts and percentages are by weight):

EXAMPLE 1

A dry mixture was prepared by admixing the following ingredients in a conventional Hobart mixer for two minutes at 60 r.p.m.: 27.5 parts potato granules (water content 7.5%), 8.6 parts dry milk solids (water content 4%). To this mixture was added 63.9 parts water and a thick dough was prepared in the mixer by mixing for 2½ minutes at 60 r.p.m. The composition of this dough was about 25.5% potato solids, about 8.3% milk solids, and about 66.2% water, within the preferred area defined by IJKLMI in FIGURE 1. The dough was divided into two portions. One portion was placed in a hand operated piston-type extruder and extruded through a die plate as strips of approximately the same size as conventional potato strips cut for French frying. The other portion was rolled into a sheet about 5/16 inch in thickness, using a conventional rolling pin, and was then sliced into strips. Sections of strips from both portions were deep fried for two minutes at approximately 350° F. in preheated "Frymax" (a commercial liquid shortening product). The fried strips from both portions were golden brown in color, showed no puffing or any signs of disintegration, and had a crisp, pleasant eating quality. This example illustrates a preferred combination of ingredients within the range of ingredients of the invention, as well as showing some of the methods suitable for preparation of products from these compositions.

The non-fat milk solids used in formulating the doughs in the following examples contained approximately 4% water, while the potato granules used contained about 7.5% water.

EXAMPLE 2

A dough composition was prepared and sectioned using the same techniques as set out in Example 1. The dough was composed of about 3.8% milk solids, about 33.3% potato solids, and about 62.9% water. The dough was slightly drier than that of Example 1, but was easily handled. After frying under the same conditions as used in Example 1 the resulting fried product had good color and general appearance (an even light brown color). The product also had a crisp eating quality and tender texture, with very little puffing. This example illustrates the suitability of somewhat lower water content compositions within the preferred area of FIGURE 1 for the preparation of excellent fried potato products.

EXAMPLE 3

A dough composition was prepared and sectioned using techniques as described in Example 1. The dough contained about 3.8% milk solids, about 40.7% potato solids and about 55.5% water. The dough was somewhat drier and more crumbly than that of Example 1 but still quite manageable. The product, which was fried under the same conditions as used in Example 1, had an excellent light brown color, and only slight puffing was evident. The product was crisp and tender in eating quality and was only slightly softer and drier than that of Example 1. This example is illustrative of compositions within the area DEFGHD of FIGURE 1 containing high potato solids content.

EXAMPLE 4

A dough composition was prepared and sectioned according to the techniques of Example 1, using 8% milk solids, 23.1% potato granules, and 67% water. The resulting dough contained 23.1% potato solids, 7.7% milk solids and 69.2% water. Although the dough was slightly wetter and stickier than that of Example 1, it was still easily formed into strips and sections. The eating quality of the product (fried under the same conditions as used in Example 1) was good, being crisp and only slightly more moist than the product of Example 1. This example illustrates the suitability of compositions having high water content within the area DEFGHD of FIGURE 1 for the preparation of excellent fried potato products.

Those familiar with the potato art will realize that additional ingredients, such as emulsifying substances (e.g., mono- and diglycerides), preservatives (e.g., sorbic acid, and sodium propionate), and flavoring substances can be added in minor amounts to the compositions of this invention in order to promote keeping quality and impart specific desired flavors and textures. Other additives, such as methyl cellulose and hydroxypropyl methyl cellulose, can also be included to give additional body to the composition. The compositions of this invention can also be prepared in a wide variety of shapes and sizes and can be cooked using several different temperatures and techniques Although the present invention has been described and illustrated with reference to specific examples, it will be understood that modifications and variations can be made without departing from the spirit and scope of the invention as set forth in the following claims.

What is claimed is:

1. The process of making a potato product suitable for frying which comprises the steps of:
   (a) combining about 21% to about 46% by weight potato solids, about 1% to about 15% by weight milk solids, and about 53% to about 73% by weight water, the combined potato solids-milk solids content being at least about 27% by weight of the mixture, gently intermixing said mixture and
   (b) forming a shaped product from said mixture and frying said shaped product.

2. The process of making a potato product suitable for frying which comprises the steps of:
   (a) combining about 24% to about 41% by weight potato solids, about 1% to about 12% by weight milk solids, and about 58% to about 69% by weight water, the combined potato solids-milk solids content being at least about 27% by weight of the mixture, gently intermixing said mixture and
   (b) forming a shaped product from said mixture and frying said shaped product.

3. A potato based dough composition suitable for the preparation of fried potato products comprising a mixture of from about 21% to about 46% by weight potato solids with from about 1% to about 15% by weight milk solids, and about 53% to about 73% by weight water, the combined potato solids-milk solids content being at least about 27% by weight of the mixture.

4. The composition of claim 3 in which the ingredients are present in the proportions of 24% to 41% by weight potato solids, 1% to 12% by weight milk solids, 58% to 69% by weight water, and the combined potato solids-milk solids content being at least about 27% by weight of the mixture.

References Cited

UNITED STATES PATENTS 2,185,451  1/1940  Webb _____ 99—207

FOREIGN PATENTS 608,996  9/1948  Great Britain.

OTHER REFERENCES

Webb, B. H., Utilization of Skim Milk in a New Potato Product, 1940 Food Inds. 12, No. 5, pp. 48 and 49.

ALVIN E. TANENHOLTZ, *Primary Examiner.*

D. M. NAFF, *Assistant Examiner.*